(12) United States Patent
Sagoo

(10) Patent No.: US 7,791,311 B2
(45) Date of Patent: Sep. 7, 2010

(54) APPARATUS AND METHOD OF WIRELESSLY SHARING POWER BY INDUCTIVE METHOD

(75) Inventor: Kiran Pal Sagoo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 593 days.

(21) Appl. No.: 11/585,218

(22) Filed: Oct. 24, 2006

(65) Prior Publication Data
US 2007/0103110 A1  May 10, 2007

(30) Foreign Application Priority Data
Oct. 24, 2005 (KR) .................. 10-2005-0100431

(51) Int. Cl.
*H02J 7/00* (2006.01)

(52) U.S. Cl. ................... 320/108; 320/103; 320/106; 320/132

(58) Field of Classification Search ............... 320/103, 320/106, 108, 149, 132
See application file for complete search history.

(56) References Cited

U.S. PATENT DOCUMENTS

| | | | | |
|---|---|---|---|---|
| 5,455,466 A | * | 10/1995 | Parks et al. ................ | 307/104 |
| 5,734,254 A | * | 3/1998 | Stephens ................... | 320/106 |
| 6,154,005 A | * | 11/2000 | Hyogo et al. .............. | 320/108 |
| 6,184,651 B1 | | 2/2001 | Fernandez et al. | |
| 6,683,438 B2 | * | 1/2004 | Park et al. ................. | 320/108 |
| 7,109,682 B2 | * | 9/2006 | Takagi et al. .............. | 320/108 |
| 7,378,817 B2 | * | 5/2008 | Calhoon et al. ........... | 320/108 |
| 2004/0145342 A1 | * | 7/2004 | Lyon ......................... | 320/108 |
| 2005/0134213 A1 | * | 6/2005 | Takagi et al. .............. | 320/108 |

FOREIGN PATENT DOCUMENTS

| | | |
|---|---|---|
| JP | 11-178234 A | 7/1999 |
| JP | 2001-186676 A | 7/2001 |
| JP | 2003-007348 A | 1/2003 |
| JP | 2003-018758 A | 1/2003 |
| JP | 2005-143181 A | 6/2005 |
| JP | 2005-151609 A | 6/2005 |
| JP | 2006-087214 A | 3/2006 |
| KR | 10-2002-0035242 A | 5/2002 |
| KR | 10-2004-0028312 A | 4/2004 |
| KR | 10-0566220 B1 | 3/2006 |

* cited by examiner

*Primary Examiner*—Edward Tso
*Assistant Examiner*—Ramy Ramadan
(74) *Attorney, Agent, or Firm*—Sughrue Mion, PLLC

(57) ABSTRACT

An apparatus and method of wirelessly sharing power by an inductive method are provided. The apparatus includes a first battery supplying power; a rectifier supplied with an AC voltage, converts the AC voltage into a DC voltage, and outputs the DC voltage; an inverter supplied with the DC voltage, converts the DC voltage into the AC voltage, and outputs the AC voltage; a power control/conversion unit connected to the rectifier or the inverter and supplying power to charge the first battery or a second battery that is provided in an external device as a power supply for the first battery; and a communication unit communicating with the external device.

9 Claims, 7 Drawing Sheets

APPARATUS AND METHOD OF WIRELESSLY SHARING POWER BY INDUCTIVE METHOD

CROSS-REFERENCE TO RELATED APPLICATION

This application claims priority from Korean Patent Application No. 10-2005-0100431 filed on Oct. 24, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to charging a power supply in a non-contact manner, and more particularly, to wirelessly sharing power by an inductive method.

2. Description of the Related Art

Mobile devices or portable devices should be continuously supplied with power in order to operate. In order to continuously supply power, batteries should be installed. Batteries can be generally divided into two main types—rechargeable and disposable. Disposable batteries are intended to be used once, until the chemical changes that induce the electrical current supply are complete, at which point the battery is discarded. In contrast, rechargeable batteries can be re-charged after they have been drained, thereby having a long lifetime.

Rechargeable batteries need to be charged for a predetermined period after discharging. The charging requires a process of converting an alternating current (AC) into a direct current (DC). This process is generally performed by a charger. Chargers are mostly fixed or semi-fixed to power sockets. Further, in the related art, chargers generally recharge batteries using proprietary terminals.

However, in this case, when charge terminals of batteries become decrepit, the charge performance can be degraded. When a battery and a charger are connected to each other by wire, the mobility of a mobile device is limited. Therefore, research into charging in a non-contact or wireless manner has been conducted.

FIG. 1 is a view showing a non-contact charging method according to the related art. In particular, British Patent No. 2398176 discloses a method of performing charging without wire or terminal contact when a charging pad 10 is provided as shown in FIG. 1 and a device 20 is placed on the charging pad 10. The device 20 subject to charging can be placed anywhere on the charging pad 10 and yet still be charged in an inductive manner, thereby allowing the device 20 to be used.

In the method of FIG. 1, the charging pad (charger) 10 is fixed, but charging is performed in an inductive manner. However, since the charging pad 10 is fixed in a state of being connected to an AC power supply, it is not possible to perform charging everywhere. That is, the mobility of a mobile device requiring charging is limited.

U.S. Pat. No. 6,653,813 discloses a DC power supply which is shared through a Personal Computer Memory Card International Association (PCMCIA) card. However, contact between a device and the card is required, which is inconvenient.

In order to maximize the portability of a mobile device, a non-contact charging method is required. Further, a charging method in which power supplies of mobile devices are shared with those of other mobile devices is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of inductively charging a battery in a non-contact or wireless manner, and more particularly, a method of charging a battery by providing a common interface among mobile/portable devices and sharing power supplies in a wireless or non-contact manner. The present invention also provides a device which detects other devices to enable charging or discharging in a non-contact manner.

The present invention also provides a battery charging method capable of being performed irrespective of the sizes and the types of mobile devices, which commonly varies with manufacturers of the mobile devices, and to make one device charge a plurality of devices.

According to an aspect of the invention, there is provided an apparatus for wirelessly sharing power by induction, the apparatus including a first battery supplying power; a rectifier supplied with an AC voltage, converts the AC voltage into a DC voltage, and outputs the DC voltage; an inverter supplied with the DC voltage, converts the DC voltage into the AC voltage, and outputs the AC voltage; a power control/conversion unit connected to the rectifier or the inverter and supplying power to charge the first battery or a second battery that is provided in an external device as a power supply for the first battery; and a local communication unit communicating with the external device.

According to another aspect of the invention, there is provided a method of wirelessly loading power by induction, the method including detecting devices capable of operating in a source mode by using a local communication unit; instructing a first device of the detected devices to operate in the source mode; connecting a rectifier to a battery and a power control/conversion unit and switching to a load mode for receiving energy from the outside; setting an inductive coil coupled with the power control/conversion unit as a secondary coil; and receiving energy from the inductive coil of the first device set as the primary coil.

According to still another aspect of the invention, there is provided a method of wirelessly supplying power by induction, the method including receiving data instructing to operate in a source mode from a first device through a local communication unit; connecting an inverter to a battery and a power control/conversion unit and switching to the source mode for supplying energy to the first device; setting an inductive coil coupled with the power control/conversion unit as a primary coil; and transmitting energy to an inductive coil of the first device set as a secondary coil.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1:
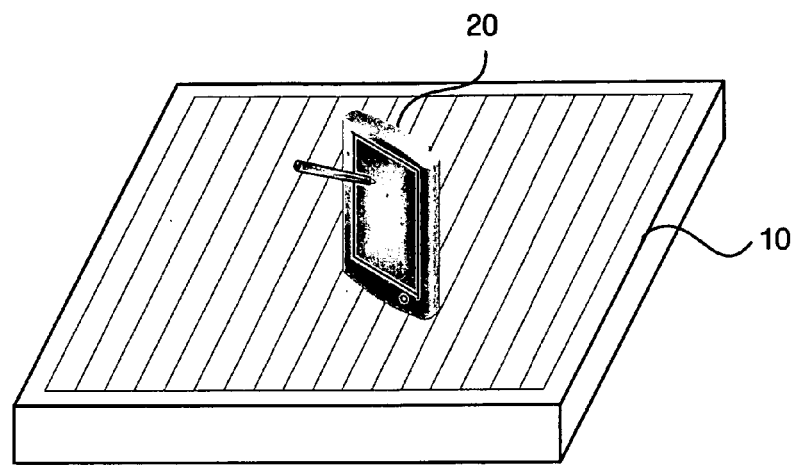
FIG. 1 is a view showing a non-contact charging method according to the related art.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the invention will be described with reference to the accompanying drawings, which are block diagrams and process flow charts illustrating apparatuses and methods of wirelessly sharing power by an induction method.

Each block can represent a module, a segment, or a portion of code including at least one instruction that can be performed for performing at least one specific logic function. Further, it should be noted that, in several alternative exemplary embodiments, the order of the functions stated in the individual blocks can be changed. For example, two blocks shown as being sequential can be substantially simultaneously performed or reversely performed according to the corresponding functions.

Figure 2:
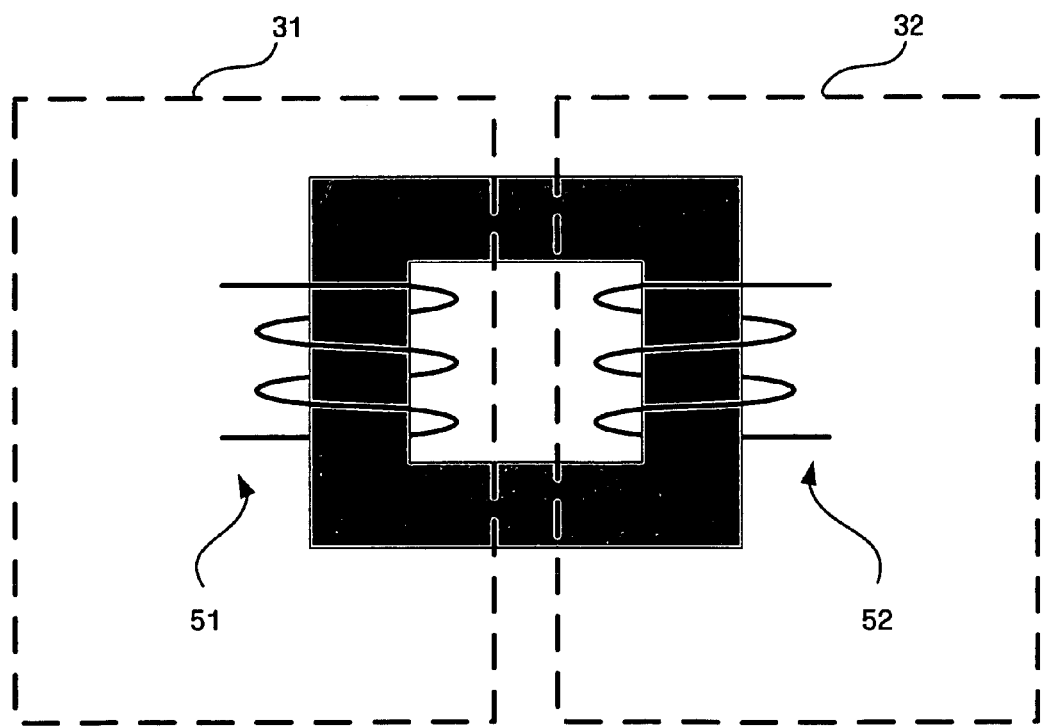
FIG. 2 is a view showing a concept in which the internal configuration of a transformer according to an exemplary embodiment of the invention is realized by mobile devices.

FIG. 2 is a view showing a transformer according to a first exemplary embodiment of the invention including a mobile device. The transformer includes a primary coil 51 and a secondary coil 52. Transformers are essentially composed of the primary and secondary coils, and energy is transferred from the primary coil to the secondary coil by an induced voltage. According to an exemplary embodiment of the invention, the primary coil and the secondary coil are separately mounted in two different devices and charging can be performed when the two devices are close to each other without being contacted with each other, unlike the related art in which primary and secondary coils are in one device.

For example, the primary coil 51 is provided in a first device 31 and the secondary coil 52 is provided in a second device 32. When the distance between the two devices is smaller than a predetermined distance, the primary coil 51 and the secondary coil 52 constitute a transformer such that energy can be transferred. In this case, the first device serves as a charger, and the second device is charged by energy from the first device.

Figure 3:
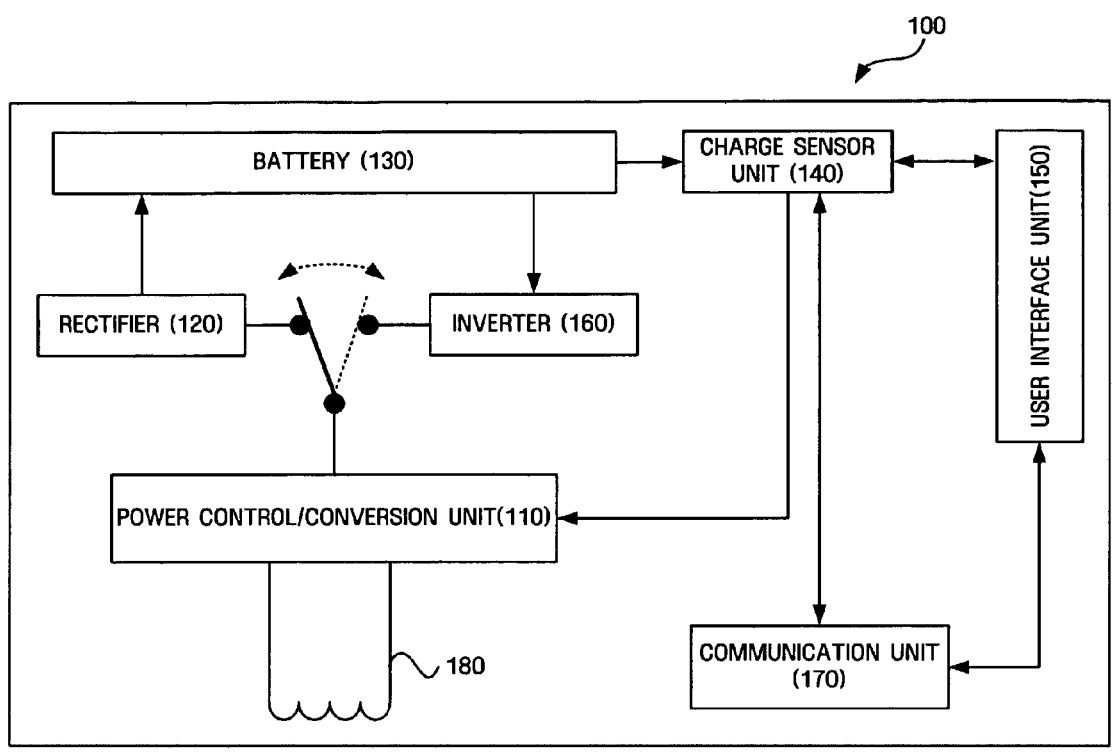
FIG. 3 is a view showing the construction of a mobile device according to an exemplary embodiment of the invention.

FIG. 3 is a view showing the construction of a mobile device 100 according to a second exemplary embodiment of the invention. The mobile device 100 can be a portable device, such as a notebook computer, a cellular phone, a personal data assistant (PDA), a portable music player (PMP), or an MPEG audio layer 3 (MP3) player. A battery 130 is essentially installed in order to operate the portable device.

The term "unit", that is, "module" or "table" includes software or a hardware component such as an field programmable gate array (FPGA) or an application specific integrated circuit (ASIC). A module has a specific function. However, a module is not limited to software or hardware. A module can be realized in an addressable storage medium and can be made to reproduce at least one processor. Therefore, as an example, a module includes components such as software components, object-oriented software components, class components, and task components, processes, functions, attributes, procedures, sub-routines, segments of program code, drivers, firmware, microcode, circuits, data, databases, data structures, tables, arrays, and variables. Functions provided in the components and modules can be combined so as to be realized by a smaller number of components and modules or can be divided so as to be realized by additional components and modules. Further, the components and the modules can be realized to reproduce at least one CPU in the device.

Hereinafter, a mode in which a mobile device provides energy to another device is referred to as a source mode, and a mode in which the battery of the mobile device is charged by energy from another device is referred to as a load mode.

The mobile device 100 includes the battery 130, a rectifier 120, an inverter 160, a power control/conversion unit 110, a charge sensor unit 140, a communication unit 170, and a user interface unit 150. The battery 130, the rectifier 120, the inverter 160, and the power control/conversion unit 110 perform operations related to charging.

The rectifier 120 is an electrical circuit element or device for converting an alternating voltage into a DC voltage. In FIG. 3, the rectifier 120 is provided with an AC voltage through the power control/conversion unit 110 and provides a DC voltage to the battery 130, thereby charging the battery 130. Rectifiers are generally used in transformers and are well known to those skilled in the art. Therefore, a detail description thereof will be omitted.

The inverter 160 is an electrical circuit element or device for converting a DC voltage into an AC voltage. In FIG. 3, the inverter 160 is supplied with a DC voltage through the battery 130 and provides an AC voltage to the power control/conversion unit 110. As a result, it is possible to charge a battery of another mobile device. Inverters are generally used in transformers and are well known to those skilled in the art. Therefore, a detail description thereof will be omitted.

The power control/conversion unit 110 is coupled to one of the rectifier 120 and the inverter 160 so that the mobile device 100 can be supplied with energy from another device (the load mode) or provide energy to another device (the source mode). The power control/conversion unit 110 controls input and output levels of AC and DC voltages. Further, the power control/conversion unit 110 operates in the load mode when the mobile device 100 is to be supplied with energy or in the source mode when the mobile device 100 is to supply energy.

The charge sensor unit 140 checks the charge state of the battery 130 and supplies the user interface unit 150 with information on whether the battery 130 needs to be charged or whether the battery has enough charge to supply energy to another device and information on whether the power control/conversion unit 110 will be coupled with the rectifier 120 or the inverter 160.

The communication unit 170 performs wireless communication, detects other mobile devices existing within a predetermined distance, receives information on the states of the other mobile devices, and controls whether the mobile device can be charged by any one of the other mobile devices. When the communication unit is made to further perform an authentication process, it is possible to prevent an unauthenticated device from being supplied with energy from another device. In order to detect devices existing within a predetermined distance, the communication unit can perform communication using radio frequency (RF) signals. For example, Near Field Communication (NFC), ultraviolet (UV) communication, Bluetooth, Zigbee, and other communication techniques can be applied. When NFC is used, it is possible to perform communication even in an environment in which there are many disturbing factors. Further, other RF techniques can be applied.

An inductive coil 180 serves as the primary coil or the secondary coil according to whether the mobile device supplies energy or is supplied with energy, as described with reference to FIG. 2.

The inductive coil 180 performs the function of the secondary coil when the mobile device is in the load mode, and performs the function of the primary coil when the mobile device is in the source mode.

The user interface unit 150 outputs information received through the charge sensor unit 140 and the communication unit 170. The user interface unit 150 may receive input about whether the mobile device will be set to the source mode or the load mode or which device will be selected in the load mode. When a plurality of mobile devices are in the source mode, it is possible to select a specific mobile device on the basis of the amount of charge in the individual mobile devices.

Figure 4:
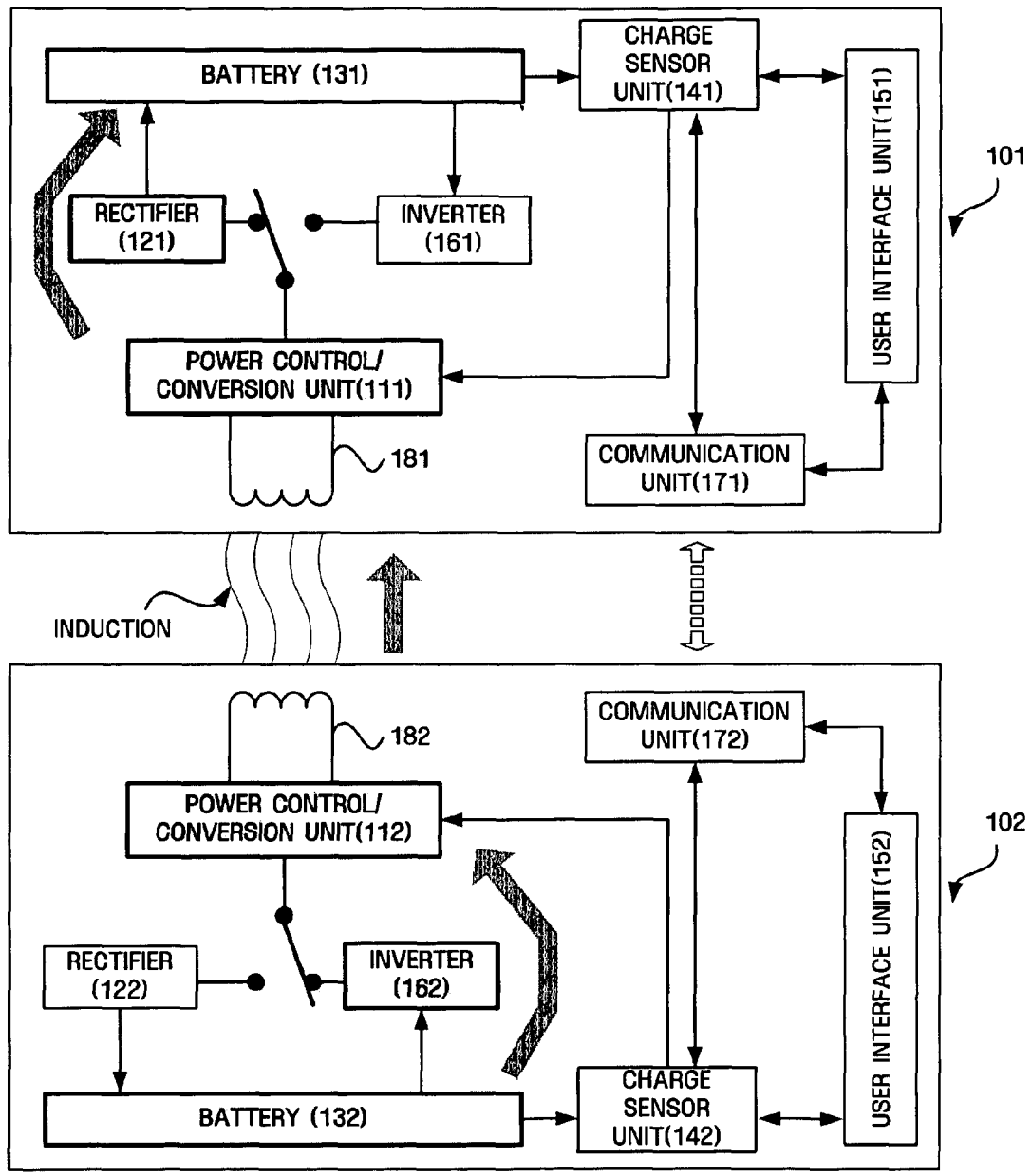
FIG. 4 is a view showing a case in which two mobile devices according to an exemplary embodiment of the invention perform charging in a non-contact manner.

FIG. 4 is a view showing two mobile devices according to an exemplary embodiment of the invention, which perform charging in a non-contact manner. In FIG. 4, a first device 101 is in the load mode, and a second device 102 is in the source mode.

A power control/conversion unit 111 of the first device 101 is connected to a rectifier 121, and the rectifier 121 converts an AC voltage into a DC voltage and provides the DC voltage to a battery 131 to charge the battery 131.

A power control/conversion unit 112 of the second device 102 is connected to an inverter 162. When the inverter 162 converts a DC voltage charged in a battery 132 into an AC voltage and supplies the AC voltage to the power control/conversion unit 112, the power control/conversion unit 112 provides energy to the first device 101.

Communication units 171 and 172 of the two mobile devices perform information exchange required for a process of providing and receiving energy. A charge sensor unit 141 of the first device 101 continuously checks the charge of the battery and provides information on the charge to the power control/conversion unit 111 to prevent excessive charging of the battery. The power control/conversion unit 111 controls energy reception such that the received energy is used to charge the battery 131 according to the charging requirements and the capacity of the battery 131.

A charge sensor unit 142 of the second device 102 continuously checks the amount of charge in the battery 132 and provides information on the charge of the battery to the power control/conversion unit 112 to prevent excessive charging of the battery.

An example of a process in which the two mobile devices share energy in a non-contact manner will now be described. A user having the first device 101 is informed through a user interface unit 151 that the battery does not have enough charge. The charge sensor unit 141 measures the charge state of the battery and communicates with the communication unit about the charge state of the battery. Rechargeable batteries such as the battery 131 of the first device 101 can be installed in devices, such as a notebook computer, a PDA, an MP3 player, and a game console, and have different voltages, currents, and capacities. The battery can be formed of, for example, a nickel metal hydride (NiMH) battery or a lithium-ion battery.

When informed that the amount of charge in the battery is not enough, the user can charge the battery. The communication unit 171 receives information on whether charging can be performed by a neighboring device and outputs the received information to the user interface unit 151. Alternatively, it is possible to automatically select a specific device to be used for charging. The device selection and output can be realized in software, and each device can be detected according to the output power of an RF signal of a communication unit.

In order to charge the battery 131 by receiving energy from the selected second device 102, the power control/conversion unit 111 and the rectifier 121 of the first device are connected with each other to supply energy to the battery 131. An inductive coil 181 coupled with the power control/conversion unit 111 serves as a secondary coil of a transformer. The first device is switched to the load mode.

The second device 102 is in the source mode and the power control/conversion unit 112 is connected to the inverter 162. DC energy of the battery 132 is converted into an alternating current by the inverter 162, and the alternating current is supplied to the first device 101 through the inductive coil 182 serving as a primary coil of a transformer. The charge sensor unit 142 checks the amount of charge in the battery 132 and provides information on the charge of the battery to the power control/conversion unit 112 to prevent excessive charging of the battery.

The communication unit 171 of the first device 101 and the communication unit 172 of the second device 102 transmit and receive data required for charging. Further, the communication units can perform authentication with respect to each other such that charging is performed between authenticated devices.

Figure 5:
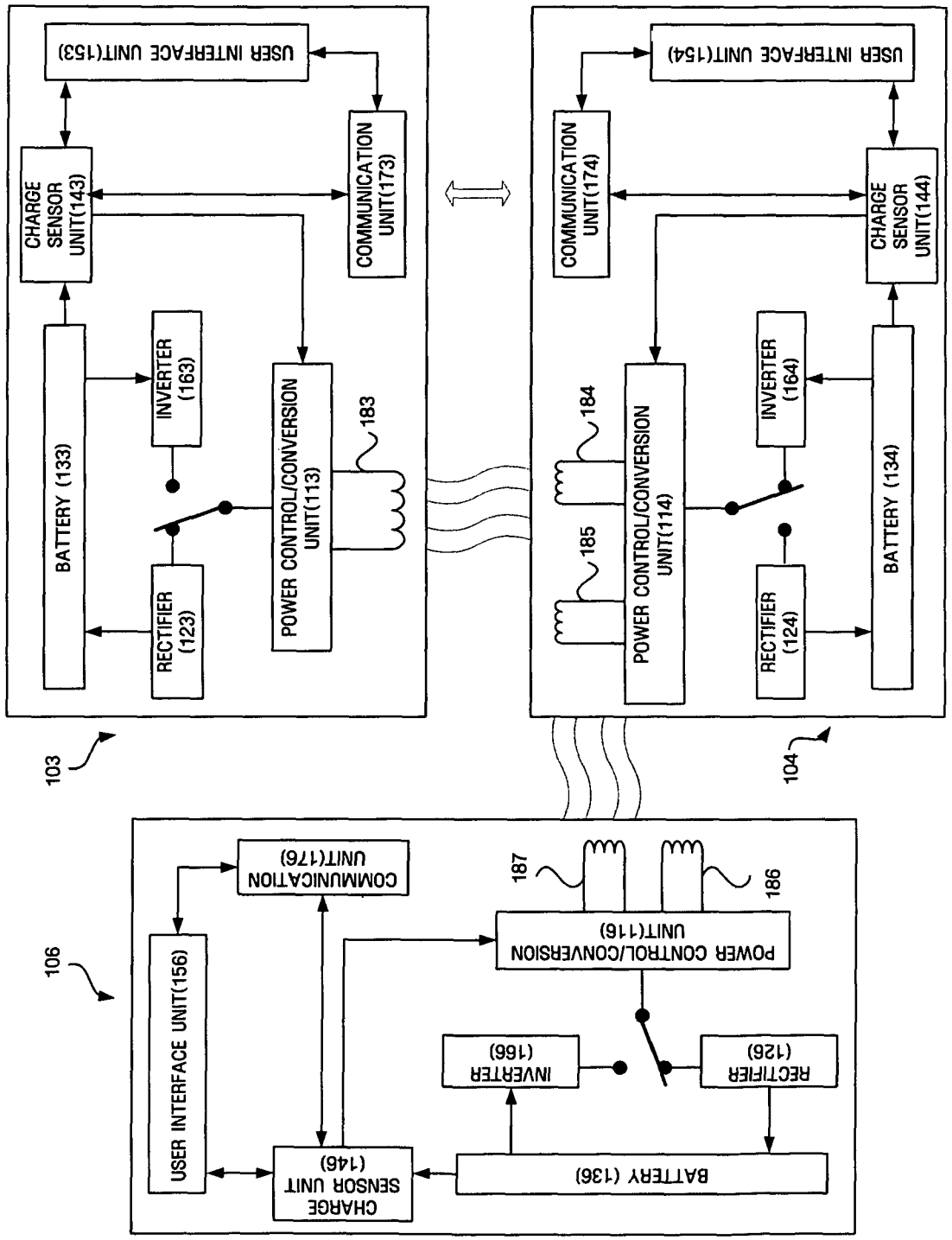
FIG. 5 is a view showing a case in which a plurality of mobile devices according to an exemplary embodiment of the invention are charged by one device.

FIG. 5 is a view showing a case in which a plurality of mobile devices are charged by one mobile device according to an exemplary embodiment of the invention.

A first device 103 and a second device 106 receive energy from a third device 104. The second device 106 and the third device 104 each have two inductive coils, and can operate in the load mode or the source mode.

An inductive coil 184 of the third device 104 is coupled with an inductive coil 183 of the first device 103 so as to supply energy, and an inductive coil 185 of the third device 104 is coupled with an inductive coil 187 of the second device 106 so as to supply energy.

In order for the devices to share energy by inductive coupling, the inside of each device needs to be shielded from an electric field or a magnetic field. The distance between the devices sharing energy is narrowed in order to minimize the effect of electromagnetic waves on the human body. For example, the distance within which the communication units communicate with each other can be equal to or more than 1 m. However, when the device shares energy in the source or load mode with a specific device, the distance between the two devices may be 10 cm or less.

Figure 6:
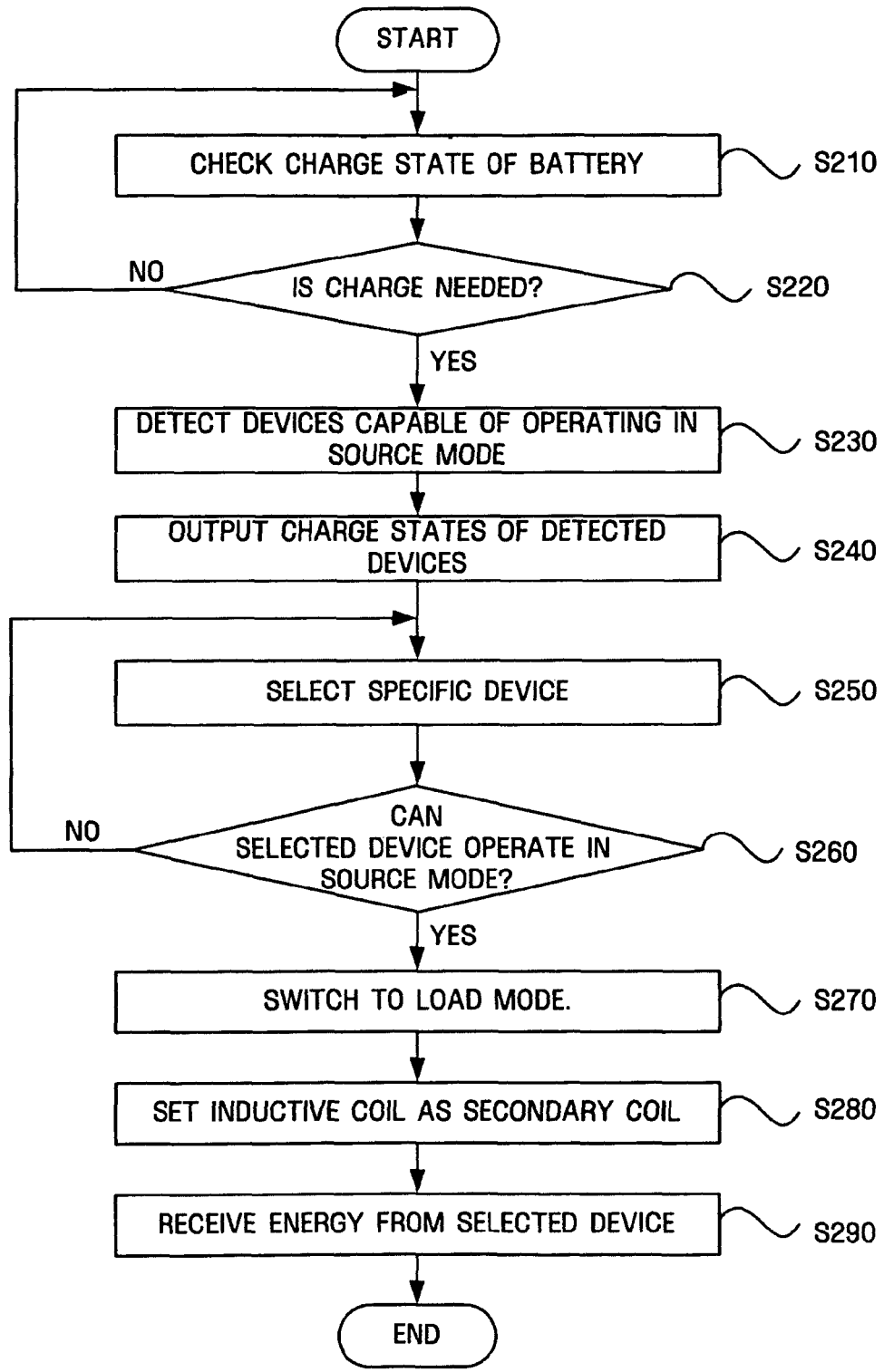
FIG. 6 is a flowchart showing an operations in a load mode in which a mobile device according to an exemplary embodiment of the invention is supplied with energy from another mobile device.

FIG. 6 is a flowchart showing an operation in the load mode in which a mobile device according to an exemplary embodiment of the invention receives energy from another mobile device.

First, the charge state of the battery is checked (S210). The charge state of the battery is checked by the charge sensor unit. When the battery needs to be charged (Yes in S220), a process of receiving energy is performed. When the battery does not need to be charged (No in S220), the charge sensor unit periodically checks the charge state of the battery (S210). When the battery needs to be charged, a device capable of operating in the source mode is detected among neighboring devices (S230). The mobile device performs local area communication with the neighboring devices through a local area communication unit so as to detect the amounts of charge in the neighboring devices. The detected charge states of the neighboring devices are output (S240). A specific device is selected among the neighboring devices through the user interface unit (S250). Alternatively, it is possible to automatically select a special device without requiring input from the user. It is checked whether the selected mobile device can operate in the source mode (S260). For example, the selected mobile device may be set so as not to operate in the source mode. Further, in a case in which the selected mobile device operates in the source mode only when the two devices authenticate each other, if the authentication fails, the selected mobile device does not operate in the source mode. When the selected mobile device cannot operate in the source mode, another mobile device can be selected.

When the selected mobile device (hereinafter, referred to as a source device) can operate in the source mode, the mobile device to be charged is switched to the load mode (S270). When the mobile device to be charged is switched to the load mode, the rectifier is connected to the battery and the power control/conversion unit such that energy can be received from the outside. Further, the inductive coil is set as the secondary coil (S280). Energy is received from the secondary coil and the primary coil of the source device (S290). The charge state of the battery can be checked while the energy is being received such that the battery is prevented from being excessively charged.

Figure 7:
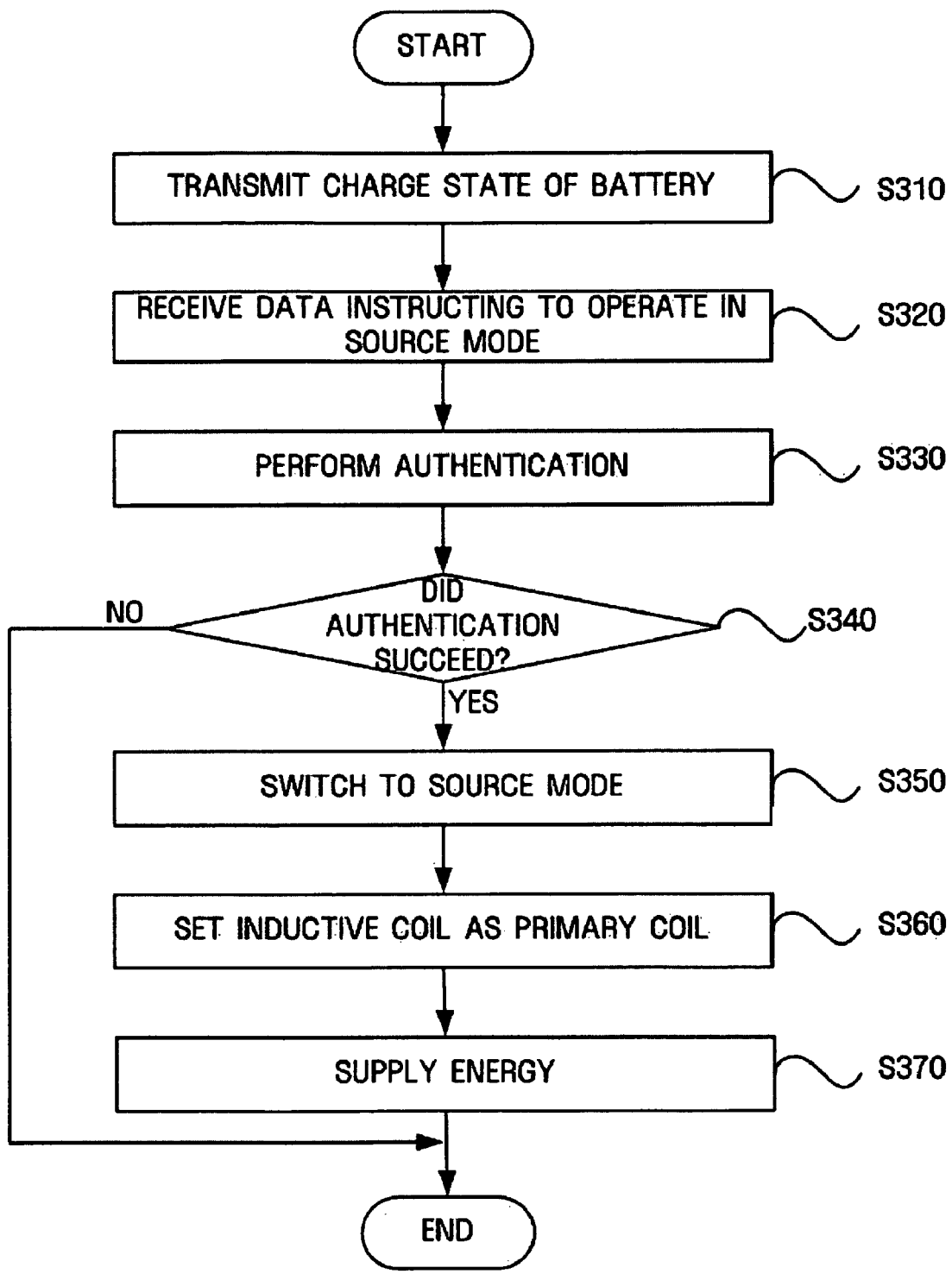
FIG. 7 is a flowchart showing an operation in a source mode in which the mobile device according to an exemplary embodiment of the invention supplies energy to another mobile device.

FIG. 7 is a flowchart showing the operation of the mobile device according to an exemplary embodiment of the invention when the mobile device is in the source mode for providing energy to another mobile device.

The charge state of the battery is transmitted to a mobile device requiring charging (referred to as a charge device) (S310). The source device receives data instructing the source device to operate in the source mode from the charge device (S320). The source device performs an authentication process with respect to the charge device (S330). This is to prevent the source device from being discharged by an unauthenticated device. Next, it is determined whether the authentication process succeeded (S340). When the authentication fails, the source device does not provide energy.

When the authentication succeeds, the source device performs an operation for supplying energy. First, the source device is switched to the source mode (S350). As described above, in order for the source device to be switched to the source mode, the inverter is connected to the battery and the power control/conversion unit such that the power of the battery can be supplied to the charge device. Then, the inductive coil is set to the primary coil (S360). Next, the source device provides energy to the charge device by using the power of the battery (S370).

While providing energy, the source device can check the charge state of the battery such that the battery is prevented from being excessively discharged.

Figure 8:
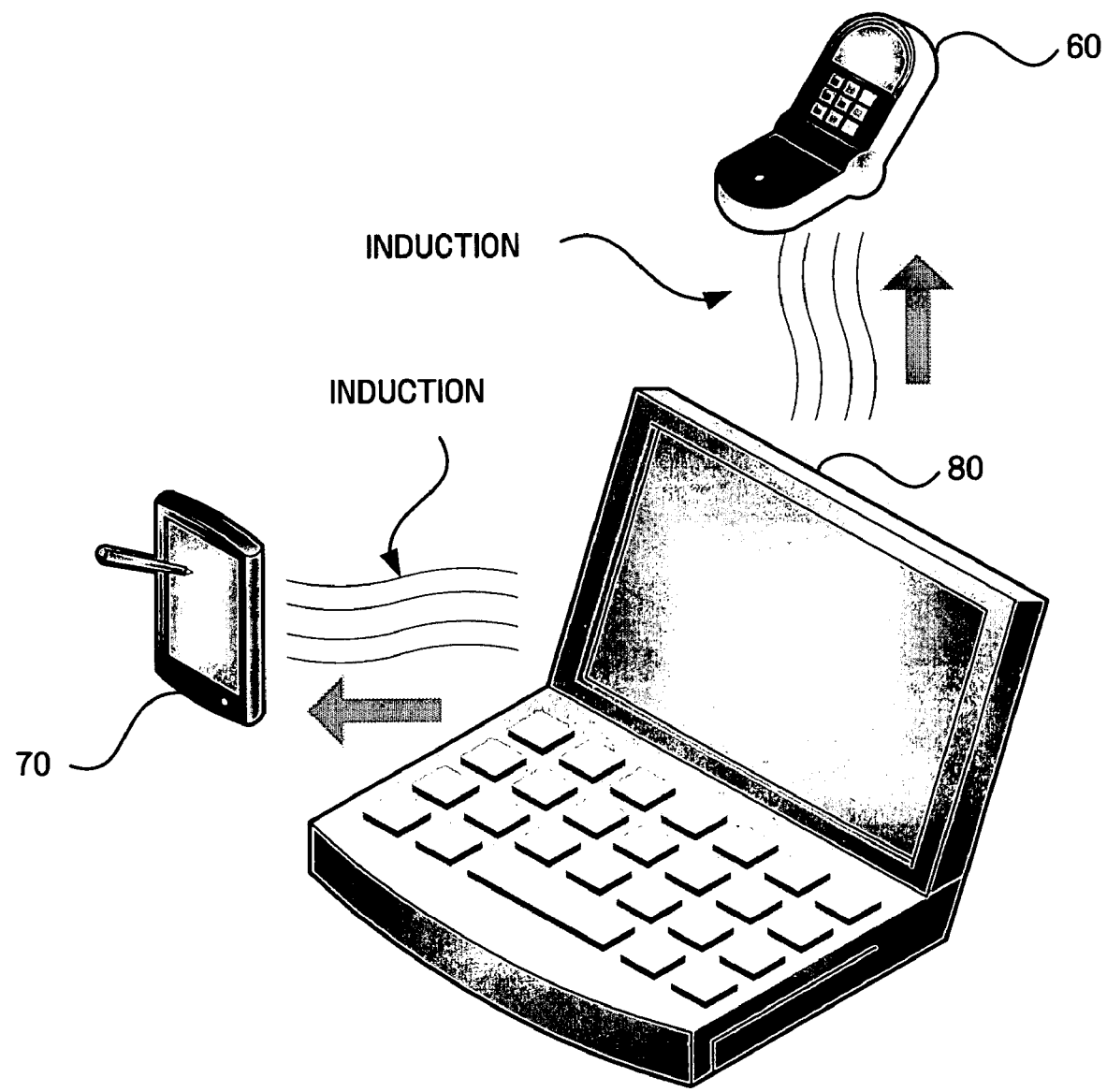
FIG. 8 is a conceptual view showing a setup of mobile devices according to an exemplary embodiment of the invention.

FIG. 8 is a conceptual view showing a setup of mobile devices according to an exemplary embodiment of the invention.

The user can make mobile devices that operate using batteries, such as a cellular phone 60, a PDA 70, and a notebook computer 80, share power. For example, when the charge of the battery of the PDA is not enough, it is possible to charge the battery of the PDA by using the battery of the notebook computer in a non-contact or wireless manner. At the same time, the battery of the notebook computer can charge the battery of the cellular phone 60.

The invention can be applied to devices constituting a Personal Area Network (PAN) as well as to cellular phones, PDAs, notebook computers, and other multimedia devices such that devices within a predetermined distance range can share power.

It will be apparent to those skilled in the art that various modifications and changes may be made without departing from the scope and spirit of the present invention. Therefore, it should be understood that the above exemplary embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims According to an exemplary embodiment of the invention, bi-directional charging can be performed between mobile devices in a non-contact manner, whereby the mobile devices can share power.

Further, according to another exemplary embodiment of the invention, since charging can be performed without any fixed AC power charger, the mobility of a mobile device can be improved, and mobile devices can share power regardless of the battery type of individual mobile devices.

What is claimed is:

1. An apparatus for wirelessly sharing power, the apparatus comprising:
    a first battery which supplies power;
    a rectifier which is supplied with an alternating current (AC) voltage, converts the AC voltage into a direct current (DC) voltage, and outputs the DC voltage;
    an inverter which is supplied with the DC voltage, converts the DC voltage into the AC voltage, and outputs the AC voltage;
    a power control and conversion unit which is connected to the rectifier or the inverter and supplying power to charge the first battery or a second battery that is provided in an external device as a power supply for the first battery;
    a first communication unit which communicates with the external device; and
    a charge sensor unit which senses a charge state of the first battery,
    wherein the charge sensor unit receives a charge state of a neighboring device through the first communication unit if a remaining amount of charge in the first battery is less than a certain amount, and
    wherein the charge sensor unit does not receive the charge state of the neighboring device through the first communication unit if the remaining amount of charge in the first battery is not less than the certain amount.

2. The apparatus of claim 1, further comprising a user interface unit which outputs the charge state of the neighboring device received by the first communication unit.

3. The apparatus of claim 1, wherein the first communication unit performs authentication with a second communication unit of the external device.

4. The apparatus of claim 1, further comprising an inductive coil which is connected to the power control and conversion unit, and is set as a primary coil or a secondary coil so as to operate as a transformer together with the external device.

5. The apparatus of claim 1, further comprising a first inductive coil which is connected to the power control and conversion unit;
wherein, if an amount of charge in the first battery is less than a certain amount, in order to charge the first battery, the power control and conversion unit is connected to the rectifier, the first inductive coil is set as a secondary coil, the first communication unit transmits to the external device data instructing the external device to be set to a power supply mode, and a second inductive coil of the external device is set as a primary coil.

6. The apparatus of claim 5, wherein, if the first communication unit receives from the external device data instructing the apparatus to be set to a power supply mode, in order to supply power to the external device, the power control and conversion unit is connected to the inverter, and the first inductive coil coupled with the power control and conversion unit is set as the primary coil.

7. The apparatus of claim 1, wherein the first communication unit performs communication using Near Field Communication.

8. The apparatus of claim 1, wherein the communication unit receives and transmits data through a radio frequency tag.

9. The apparatus of claim 1, wherein the charge sensor unit periodically checks the remaining amount of charge of the first battery if the remaining amount of charge in the first battery is not less than the certain amount.

* * * * *